United States Patent
Lee

(10) Patent No.: US 11,252,657 B2
(45) Date of Patent: Feb. 15, 2022

(54) ELECTRONIC APPARATUS AND CONTROL METHOD THEREOF

(71) Applicant: SAMSUNG ELECTRONICS CO., LTD., Suwon-si (KR)

(72) Inventor: Hyungyong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 22 days.

(21) Appl. No.: 16/985,659

(22) Filed: Aug. 5, 2020

(65) Prior Publication Data

US 2021/0045053 A1 Feb. 11, 2021

(30) Foreign Application Priority Data

Aug. 6, 2019 (KR) .................. 10-2019-0095451

(51) Int. Cl.
*H04W 88/02* (2009.01)
*H04W 84/12* (2009.01)
*H04W 48/20* (2009.01)
*H04W 48/16* (2009.01)
*H04W 24/10* (2009.01)

(52) U.S. Cl.
CPC .......... *H04W 48/20* (2013.01); *H04W 24/10* (2013.01); *H04W 48/16* (2013.01); *H04W 84/12* (2013.01); *H04W 88/02* (2013.01)

(58) Field of Classification Search
CPC ............. H04B 7/2606; H04B 7/15528; H04B 7/15542; H04B 7/15507; H04B 3/36; H04B 7/15; H04B 7/14; H04B 10/0777; H04B 17/40; H04W 88/04; H04W 84/047; H04W 24/02; H04W 24/04; H04W 8/005; H04W 48/20; H04W 48/16; H04W 24/10; H04W 88/02; H04W 84/12; H04W 88/06

See application file for complete search history.

(56) References Cited

U.S. PATENT DOCUMENTS

| 2003/0063607 | A1* | 4/2003 | Adachi | H04W 88/04 370/389 |
| 2006/0252367 | A1* | 11/2006 | Haartsen | H04W 72/087 455/11.1 |
| 2012/0201333 | A1* | 8/2012 | Okamoto | H04L 27/2647 375/340 |

(Continued)

FOREIGN PATENT DOCUMENTS

KR 101851634 B1 4/2018

*Primary Examiner* — Daniel Lai
(74) *Attorney, Agent, or Firm* — Sughrue Mion, PLLC

(57) ABSTRACT

An electronic apparatus and method of performing wireless communication. The electronic apparatus includes: a communication circuit configured to perform wireless communication with a relay apparatus; and a processor configured to: identify a plurality of relay apparatuses connectable with the communication circuit, the plurality of relay apparatuses communicating in a plurality of frequency bands, the plurality of frequency bands being different from one another, identify a first relay apparatus having a frequency band, in which a transmission performance is relatively higher than a second relay apparatus, among the plurality of identified relay apparatuses, and perform the wireless communication with the identified first relay apparatus.

18 Claims, 8 Drawing Sheets

(56) References Cited

U.S. PATENT DOCUMENTS

| | | | |
|---|---|---|---|
| 2014/0010108 A1* | 1/2014 | Tavildar | H04W 8/005 370/254 |
| 2014/0086139 A1* | 3/2014 | Kang | H04W 72/02 370/315 |
| 2019/0190586 A1* | 6/2019 | Tanaka | H04B 7/14 |

* cited by examiner

FIG. 5

| 2.4GHz DATA TRANSFER SPEED(Mbps) | | | | 5GHz DATA TRANSFER SPEED(Mbps) | | | |
|---|---|---|---|---|---|---|---|
| SIGNAL STRENGTH(dBm) | 802.11b | 802.11g | 802.11n | SIGNAL STRENGTH(dBm) | 802.11a | 802.11n | 802.11ac |
| -30 | 11 | 54 | 90 | -30 | 54 | 90 | 250 |
| -40 | 10 | 54 | 83 | -40 | 53 | 90 | 250 |
| -50 | 10 | 53 | 67 | -50 | 52 | 90 | 250 |
| -60 | 9 | 46 | 55 | -60 | 51 | 88 | 200 |
| -65 | 7 | 35 | 18 | -65 | 40 | 58 | 180 |
| -70 | 5 | 18 | 7 | -70 | 24 | 13 | 50 |
| -75 | 3 | 10 | 2.5 | -75 | 13 | 9 | 0.3 |
| -80 | 0.5 | 3 | 0.1 | -80 | 5 | 0.8 | 0 |

| 2.4GHz DATA TRANSFER SPEED(Mbps) | | | |
|---|---|---|---|
| SIGNAL STRENGTH(dBm) | 802.11b | 802.11g | 802.11n |
| -30 | 11 | 54 | 90 |
| -40 | 10 | 54 | 83 |
| -50 | 10 | 53 | 78 |
| -60 | 9 | 46 | 55 |
| -65 | 7 | 35 | 18 |
| -70 | 5 | 18 | 7 |
| -75 | 3 | 10 | 2.5 |
| -80 | 0.5 | 3 | 0.1 |

| 5GHz DATA TRANSFER SPEED(Mbps) | | | |
|---|---|---|---|
| SIGNAL STRENGTH(dBm) | 802.11a | 802.11n | 802.11ac |
| -30 | 44 | 80 | 250 |
| -40 | 43 | 78 | 240 |
| -50 | 41 | 60 | 220 |
| -60 | 39 | 53 | 170 |
| -65 | 30 | 48 | 155 |
| -70 | 14 | 23 | 80 |
| -75 | 3 | 8 | 2 |
| -80 | 0.5 | 1.2 | 0 |

| AP | SIGNAL STRENGTH(dBM) | FASTEST TRANSMISSION MODE | TRANSFER SPEED (Mbps) | RANK |
|---|---|---|---|---|
| FIRST AP | -60 | 802.11n(5GHz) | 88 | 1 |
| SECOND AP | -50 | 802.11n(2.4GHz) | 67 | 2 |
| THIRD AP | -75 | 802.11g | 10 | 4 |
| FOURTH AP | -70 | 802.11ac | 50 | 3 |

ELECTRONIC APPARATUS AND CONTROL METHOD THEREOF

CROSS-REFERENCE TO RELATED THE APPLICATION

This application is based on and claims priority under 35 U.S.C. § 119 to Korean Patent Application No. 10-2019-0095451 filed on Aug. 6, 2019 in the Korean Intellectual Property Office, the disclosure of which is incorporated by reference herein in its entirety.

BACKGROUND

1. Field

The disclosure relates to an electronic apparatus provided to perform wireless communication with an external apparatus through an access point (AP) or the like communication relay apparatus and a method of controlling the same, and more particularly to an electronic apparatus, which can identify a communication relay apparatus providing the best communication quality among a plurality of communication relay apparatuses connectable for communication, and a control method thereof.

2. Description of the Related Art

To compute and process predetermined information in accordance with certain processes, an electronic apparatus basically includes a central processing unit (CPU), a chipset, a memory, and the like electronic components for the computation. Such an electronic apparatus may be variously classified in accordance with information to be processed and what the electronic apparatus is used for. For example, the electronic apparatus is classified into an information processing apparatus such as a personal computer (PC), a server or the like for processing general information; an image processing apparatus for processing image data; an audio apparatus for audio process; home appliances for miscellaneous household chores; etc. The image processing apparatus may be embodied as a display apparatus that displays an image based on processed image data on its own display panel.

Because portability is essential for an electronic apparatus embodied as a mobile apparatus, the electronic apparatus is generally connected to a network through a wireless communication. The wireless communication may also be applied to a stationary electronic apparatus, like a television (TV), etc. due to aesthetic and management problems caused by complicated wiring of many cables. There are two major methods of performing wireless communication between two electronic apparatuses. One is that the two electronic apparatuses are directly connected one-to-one. Such wireless communication standards include Bluetooth, Wi-Fi Direct, Zigbee, etc. The other one is that the electronic apparatuses are respectively connected to many communication relay apparatuses connected to a wide area network (WAN) and the two electronic apparatuses are connected to each other via these communication relay apparatuses. Such wireless communication standards include Wi-Fi.

As an example of the communication relay apparatus, there is an access point (AP). The AP has a coverage area of a predetermined range, and the electronic apparatus can communicate with the AP only within this coverage area. The electronic apparatus displays a user interface (UI) allowing a user to select whether to access an AP when it enters the coverage area of the AP, and communicates with the AP based on the user's selection input to the UI.

The electronic apparatus may enter not the coverage area of one AP, but the coverage areas of plurality of APs. In this case, the electronic apparatus displays a UI allowing a user to select which AP among the plurality of APs to connect with, and connects and communicates with the AP selected through the UI. The electronic apparatus may list the plurality of APs in order in which the plurality of APs are detected by scanning. In this case, the UI does not provide accurate information about which AP among the plurality of APs has the best network quality when connected.

Therefore, a method of selecting the AP having substantially the best network quality may be required under the condition that the electronic apparatus is connectable to the plurality of APs.

SUMMARY

According to an embodiment, there is provided an electronic apparatus including: a communication circuit configured to perform wireless communication with a relay apparatus; and a processor configured to: identify a plurality of relay apparatuses connectable with the communication circuit, the plurality of relay apparatuses communicating in a plurality of frequency bands, the plurality of frequency bands being different from one another, identify a first relay apparatus having a frequency band, in which a transmission performance is relatively higher than a second relay apparatus, among the plurality of identified relay apparatuses, and perform the wireless communication with the identified first relay apparatus.

The processor is further configured to obtain information about a relationship between the frequency band and the transmission performance, and identify the first relay apparatus based on the obtained information.

The processor is further configured to identify each signal strength of the plurality of relay apparatuses, and identify the first relay apparatus based on the identified each signal strength of the plurality of relay apparatuses.

The frequency band includes a plurality of transmission modes, and the processor is further configured to identify the first relay apparatus by identifying a first transmission mode, in which the transmission performance is relatively higher than a second transmission mode, among the plurality of transmission modes of the plurality of relay apparatuses, and comparing the transmission performance of the first transmission mode and the second transmission mode.

The communication circuit includes a communication chipset configured to perform the wireless communication, and the processor is further configured to identify features according to the plurality of frequency bands of the communication chipset, and identify the first relay apparatus based on the identified features according to the plurality of frequency bands of the communication chipset.

The processor is further configured to provide an interface to a user so that the first relay apparatus of which the transmission performance is higher than the second relay apparatus can be connected in preference among the plurality of relay apparatuses.

The electronic apparatus further includes a display, and the processor is further configured to control the display to display a list on which the plurality of relay apparatuses are sorted in an order of the transmission performance.

The processor is further configured to control the communication circuit to connect with the first relay apparatus.

The communication circuit is configured to communicate with the first relay apparatus based on Institute of Electrical and Electronics Engineers (IEEE) 802.11 standards.

According to an embodiment, there is provided a method of controlling an electronic apparatus, the method including: identifying a plurality of relay apparatuses connectable with the electronic apparatus, the plurality of relay apparatuses communicating in a plurality of frequency bands, the plurality of frequency bands being different from one another; identifying a first relay apparatus having a frequency band, in which a transmission performance is relatively higher than a second relay apparatus, among the plurality of identified relay apparatuses; and performing wireless communication with the identified first relay apparatus.

The method further includes obtaining information about a relationship between the frequency band and the transmission performance, and identifying the first relay apparatus based on the obtained information.

The method further includes: identifying each signal strength of the plurality of relay apparatuses, and identifying the first relay apparatus based on the identified each signal strength of the plurality of relay apparatuses.

The frequency band includes a plurality of transmission modes, and wherein the method further includes: identifying the first relay apparatus by identifying a first transmission mode, in which the transmission performance is relatively higher than a second transmission mode, among the plurality of transmission modes of the plurality of relay apparatuses and comparing the transmission performance of the first transmission mode and the second transmission mode.

The method further includes identifying features according to the plurality of frequency bands of a communication chipset of the electronic apparatus, and identifying the first relay apparatus based on the identified features according to the plurality of frequency bands of the communication chipset.

The method further includes providing an interface to a user so that the first relay apparatus of which the transmission performance is higher than the second relay apparatus can be connected in preference among the plurality of relay apparatuses.

The method further includes displaying a list on which the plurality of relay apparatuses are sorted in an order of the transmission performance.

The method further includes controlling a communication circuit of the electronic apparatus to connect with the first relay apparatus.

The electronic apparatus is configured to communicate with the first relay apparatus based on Institute of Electrical and Electronics Engineers (IEEE) 802.11 standards.

BRIEF DESCRIPTION OF THE DRAWINGS

The above and/or other aspects, features and advantages will become apparent and more readily appreciated from the following description of embodiments, taken in conjunction with the accompanying drawings, in which:

FIG. 5 shows a list on which data transfer speeds are put according to transmission modes of a first communication module included in an electronic apparatus according to an example embodiment;

FIG. 6 is a table in which data transfer speeds are tabulated corresponding to transmission modes of a second communication module included in an electronic apparatus according to an example embodiment;

FIG. 7 illustrates a list from which an electronic apparatus identifies an AP showing the highest data transfer speed according to an example embodiment.

DETAILED DESCRIPTION

Embodiments will be described in detail with reference to accompanying drawings. Further, the embodiments described with reference to the accompanying drawings are not exclusive to each other unless otherwise indicated, and a plurality of embodiments may be selectively combined within one apparatus. The combination of these embodiments may be discretionally selected and applied to realize the embodiments of the disclosure by a person having an ordinary skill in the art.

In the description of the embodiments, an ordinal number used in terms such as a first element, a second element, etc. is employed for describing variety of elements, and the terms are used for distinguishing one element from another element. Therefore, the meanings of the elements are not limited by the terms, and the terms are also used for explaining the corresponding embodiment without limiting the disclosure.

Further, a term "at least one" among a plurality of elements represents not only all the elements but also each one of the elements, which excludes the other elements or all combinations of the elements.

Figure 1:
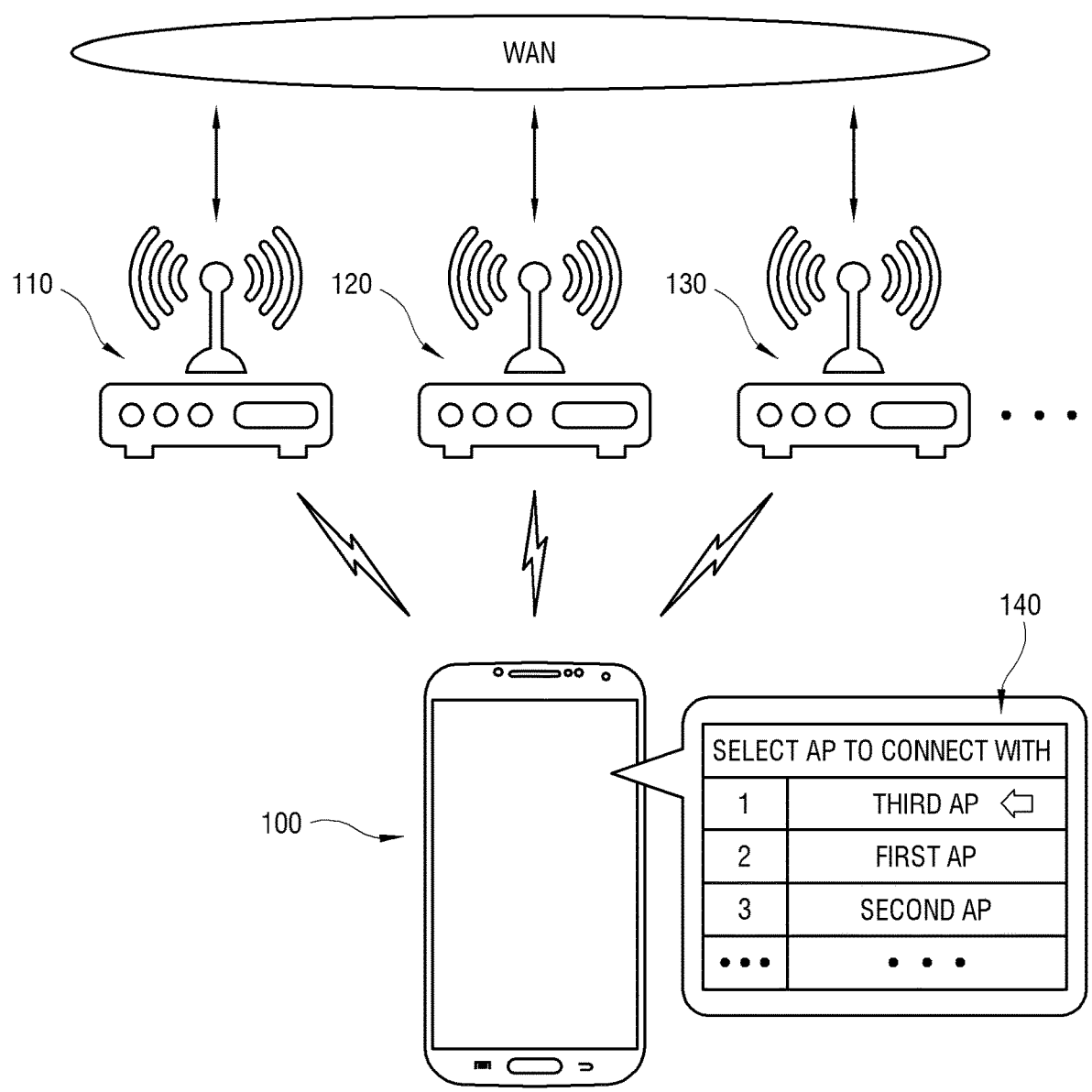
FIG. 1 illustrates an environment where an electronic apparatus can wirelessly communicate with a plurality of access points (APs) according to an example embodiment.

FIG. 1 illustrates an environment where an electronic apparatus can wirelessly communicate with a plurality of access points (APs) according to an embodiment.

As shown in FIG. 1, an electronic apparatus 100 according to an embodiment may be a mobile display apparatus. The electronic apparatus 100 may include a portable multimedia player, a tablet computer, a smartphone, a wearable device, etc. However, the electronic apparatus 100 is not limited to the mobile display apparatus, but may include a display apparatus that is stationary, such as a television (TV), an electronic frame, a digital signage, etc. Further, the electronic apparatus may also include an image processing apparatus, such as a set-top box, an optical media player, home appliances, an information processing apparatus and etc.

The electronic apparatus 100 supports various wireless communication standards and performs wireless communication with an external apparatus. A wireless communication method may broadly be classified into two methods, in which one is a method of being connected through communication relay apparatuses 110, 120 and 130 that are connected to a wide area network (WAN), and the other is a method of being directly connected to the WAN. In this embodiment, the former case will be described.

The communication relay apparatuses 110, 120 and 130 are connected to the WAN as connected to a router, a gateway, etc. by a wire, and configured to relay wireless communication for all connected apparatuses. The communication relay apparatuses 110, 120 and 130 may be called various terms such as a communication hub, a wireless router, etc. The communication relay apparatuses 110, 120 and 130 may be provided based on various wireless communication standards. For example, the communication relay apparatuses 110, 120 and 130 may include APs 110, 120 and 130 supporting Institute of Electrical and Electronics Engineers (IEEE) 802.11 standards.

The APs 110, 120 and 130 are provided to allow apparatuses located within a predetermined area to access a wireless local area network (WLAN), and may use a frequency band of 2.4 GHz or 5 GHz. The coverage areas of the APs 110, 120 and 130 may vary depending on indoor environments, outdoor environments, frequency bands, and transmission modes. For example, the coverage area may range from as little as several meters to as much as 250 meters according to the frequencies and transmission modes under the outdoor environments.

According to the arrangement of the plurality of APs 110, 120 and 130 and the location of the electronic apparatus 100, the electronic apparatus 100 may connect and communicate with all the plurality of APs 110, 120 and 130. In this case, the electronic apparatus 100 may select and access one among the plurality of APs 110, 120 and 130, and connect to a network through the selected AP to perform wireless communication. Specifically, the electronic apparatus 100 may automatically select one AP 110, 120 or 130 having the best communication quality among the plurality of APs 110, 120 and 130. Further, the electronic apparatus 100 may display a user interface (UI) 140 allowing a user to select one among the plurality of currently connectable APs 110, 120 and 130, and select the AP 110, 120 or 130 selected through the UI 140. Here, the electronic apparatus 100 may sort and display the plurality of APs 110, 120 and 130 on the UI 140 in order of communication quality. The communication quality may have various parameters, and it will be described in this embodiment that the communication quality includes data transfer performance between the apparatuses.

For example, under the condition that the electronic apparatus 100 is connectable to any one of a first AP 110, a second AP 120 and a third AP 130, the electronic apparatus 100 may identify the communication quality for each of the first AP 110, the second AP 120 and the third AP 130, and sort items of the first AP 110, the second AP 120 and the third AP 130 in the order of high to low communication quality. When there are many connectable APs 110, 120 and 130, the UI 140 shows one of the APs 110, 120 or 130 having the best communication quality at the top of the list so that a user can easily identify and select one of the APs 110, 120 or 130 having the best communication quality without scrolling through the UI 140. For example, when the third AP 130 has the best communication quality, the UI 140 shows an item for selecting the third AP 130 at the top of the list among the plurality of APs 110, 120 and 130.

The electronic apparatus 100 identifies the communication quality of the plurality of APs 110, 120 and 130, specifically, identifies a transmission performance value between the electronic apparatus 100 and each of the APs 110, 120 and 130, thereby enabling the electronic apparatus 100 to compare the plurality of APs 110, 120 and 130 with respect to the communication quality. In this regard, details will be described later.

Below, the configuration of the electronic apparatus 100 will be described.

Figure 2:
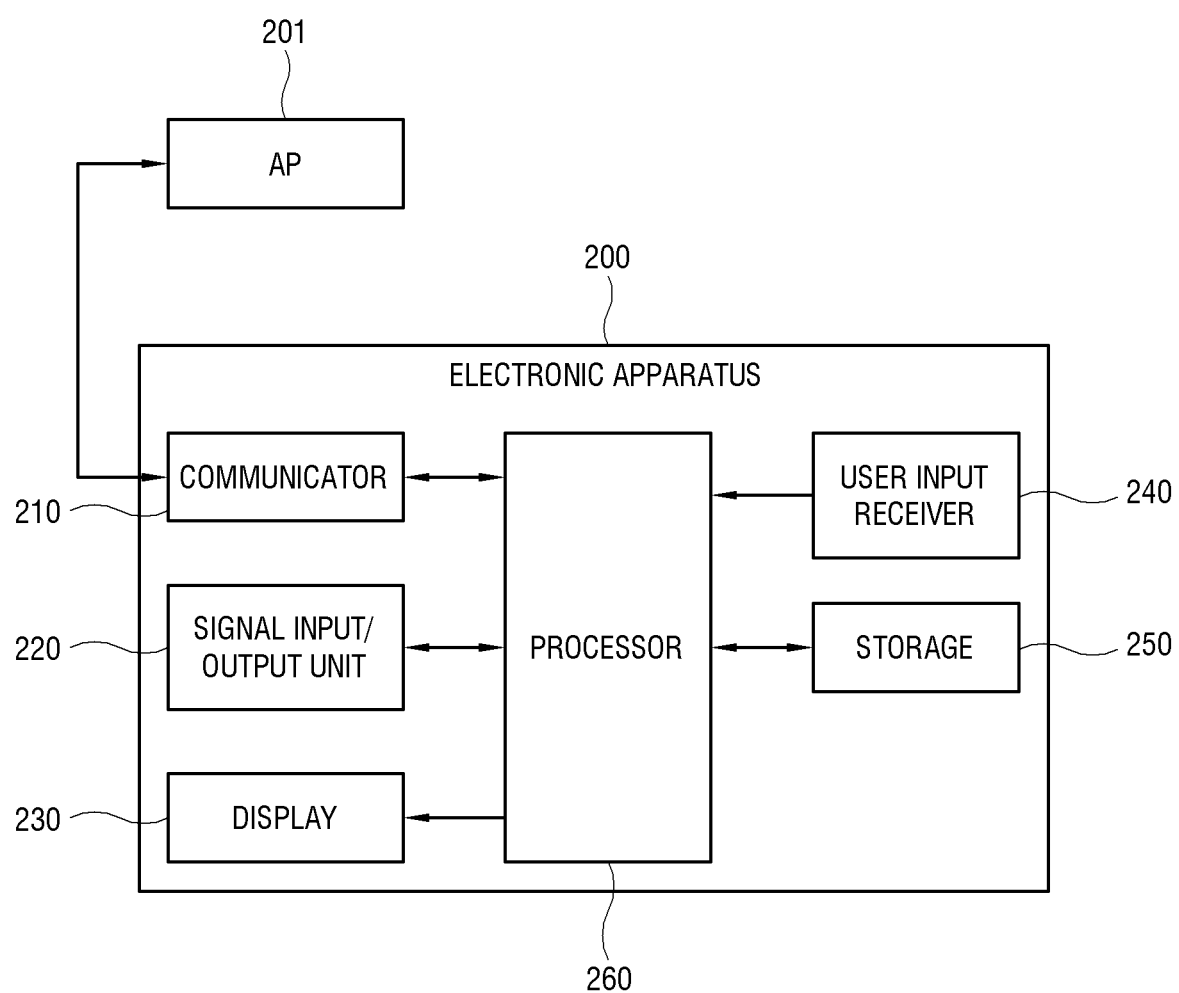
FIG. 2 is a block diagram of an electronic apparatus according to an example embodiment.

FIG. 2 is a block diagram of an electronic apparatus according to an embodiment.

As shown in FIG. 2, an electronic apparatus 200 includes a communicator 210, a signal input/output unit 220, a display 230, a user input receiver 240, a storage 250, and a processor 260.

The communicator 210 refers to an interactive communication circuit that includes at least one of elements, such as a communication module, a communication chipset, etc. corresponding to various wired and wireless communication protocols. According to an embodiment, the communicator 210 includes a wireless communication module to perform wireless communication with an access point (AP) based on Wi-Fi. Further, the communicator 210 may include a wireless communication module that performs one-to-one direct wireless communication like Bluetooth, etc., or a local area network (LAN) card connected to a router or a gateway by a wire. The communicator 210 may communicate with a server or an external apparatus on a network via the AP 201.

The signal input/output unit 220 is 1:1 or 1:N (where, N is a natural number) connected to an external apparatus such as a TV, an optical media player, a computer, etc. by a cable, thereby receiving or outputting data from and to the corresponding external apparatus. The signal input/output unit 220 may for example include a high definition multimedia interface (HDMI) port, a DisplayPort, a digital visual interface (DVI) port, Thunderbolt, a universal serial bus (USB) port, and the like connectors or ports according to preset transmission standards.

The display 230 includes a display panel capable of displaying an image on a screen. The display panel is provided to have a light receiving structure such as a liquid crystal type, or a self-emissive structure such as an organic light emitting diode (OLED) type. The display 230 may include an additional element according to the structures of the display panel. For example, when the display panel is the liquid crystal type, the display 230 includes a liquid crystal display panel, a backlight unit configured to emit light, and a panel driving substrate configured to drive liquid crystal of the liquid crystal display panel.

The user input receiver 240 includes circuitry related to various input interfaces provided to be controlled by a user to make an input. The user input receiver 240 may be variously configured according to the type of electronic apparatus 200, and may for example include a mechanical or electronic button of the electronic apparatus 200, a touch pad, a touch screen installed in the display 230, etc.

The storage 250 is configured to store digitalized data. The storage 250 includes a nonvolatile storage in which data is retained regardless of whether power is supplied or not, and a volatile memory to which data to be processed by the processor 260 is loaded and in which data is retained while power is being supplied. The nonvolatile storage includes a flash memory, a hard-disk drive (HDD), a solid-state drive (SDD) read only memory (ROM), etc., and the memory includes a buffer, a random-access memory (RAM), etc.

The processor 260 includes one or more hardware processors achieved by a central processing unit (CPU), a chipset, a buffer, a circuit, etc. which are mounted on a printed circuit board (PCB). Alternatively, the processor 260 may be designed as a system on chip (SoC). The processor 260 includes modules corresponding to various processes, such as a demultiplexer, a decoder, a scaler, an audio digital signal processor (DSP), an amplifier, etc. Among such modules, some or all of the modules may be achieved by the SoC. For example, a demultiplexer, a decoder, a scaler, and the like module related to an image process may be achieved as an image processing SoC, and an audio DSP may be achieved as a chipset separated from the SoC.

The processor 260 may be configured to transmit and receive data packet with the AP 201 to establish a communication route to the AP 201 when the AP 201 is newly detected through the communicator 210. When a plurality of APs 201 are detected, the processor 260 may identify the communication quality with each of APs 201 and automatically connect with one of the APs 201 having the best communication quality or display a UI through which the plurality of APs 201 are selectable in the order of high to low communication quality.

Further, the processor 260 may perform at least one of data analysis, data process, and result information generation to identify the AP 201 having the best communication quality among the plurality of APs 201, based on a rule-based algorithm or at least one of a machine learning algorithm, a neural network algorithm, a deep-learning algorithm or the like artificial intelligence (AI) algorithm.

For example, the processor 260 may perform both functions of a learner and a recognizer. The learner may perform a function for generating a learned neural network, and the recognizer may perform a function of recognizing (or, inferring, predicting, estimating or identifying) data based on the learned neural network. The learner may generate or update the neural network. The learner may obtain learning data to generate the neural network. For example, the learner may obtain the learning data from the storage 250 or the outside. The learning data may be sample data used in learning the neural network, and the data used in performing operation to identify the communication quality of the AP 201 may be used as the learning data to teach the neural network.

Before teaching the neural network based on the learning data, the learner may perform a preprocessing operation with regard to the obtained learning data or select data to be used in learning among a plurality of pieces of the learning data. For example, the learner may process the learning data to have a preset format, apply filtering to the learning data, or process the learning data to be suitable for the learning by adding/removing noise to/from the learning data. The learner may use the preprocessed learning data to generate the neural network set to perform the operations related to the identification of the communication quality of the AP 201.

The learned neural network may include a plurality of neural networks (or layers). The nodes of the plurality of neural networks have weights, and the plurality of neural networks may be connected to one another so that an output value of a certain neural network can be used as an input value of another neural network. As an example of the neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN) and deep Q-networks.

The recognizer may obtain target data to carry out the operations related to the identification of the communication quality of the AP 201. The target data may be obtained from the storage 250 or the outside. The target data may be data targeted to be recognized by the neural network. Before applying the target data to the learned neural network, the recognizer may perform a preprocessing operation with respect to the obtained target data, or select data to be used in recognition among a plurality of pieces of target data. For example, the recognizer may process the target data to have a preset format, apply filtering to the target data, or process the target data into data suitable for recognition by adding/removing noise. The recognizer may obtain an output value output from the neural network by applying the preprocessed target data to the neural network. Further, the recognizer may obtain a stochastic value or a reliability value together with the output value.

Below, a method by which the electronic apparatus 200 identifies a certain AP 201 among the plurality of APs 201 will be described.

Figure 3:
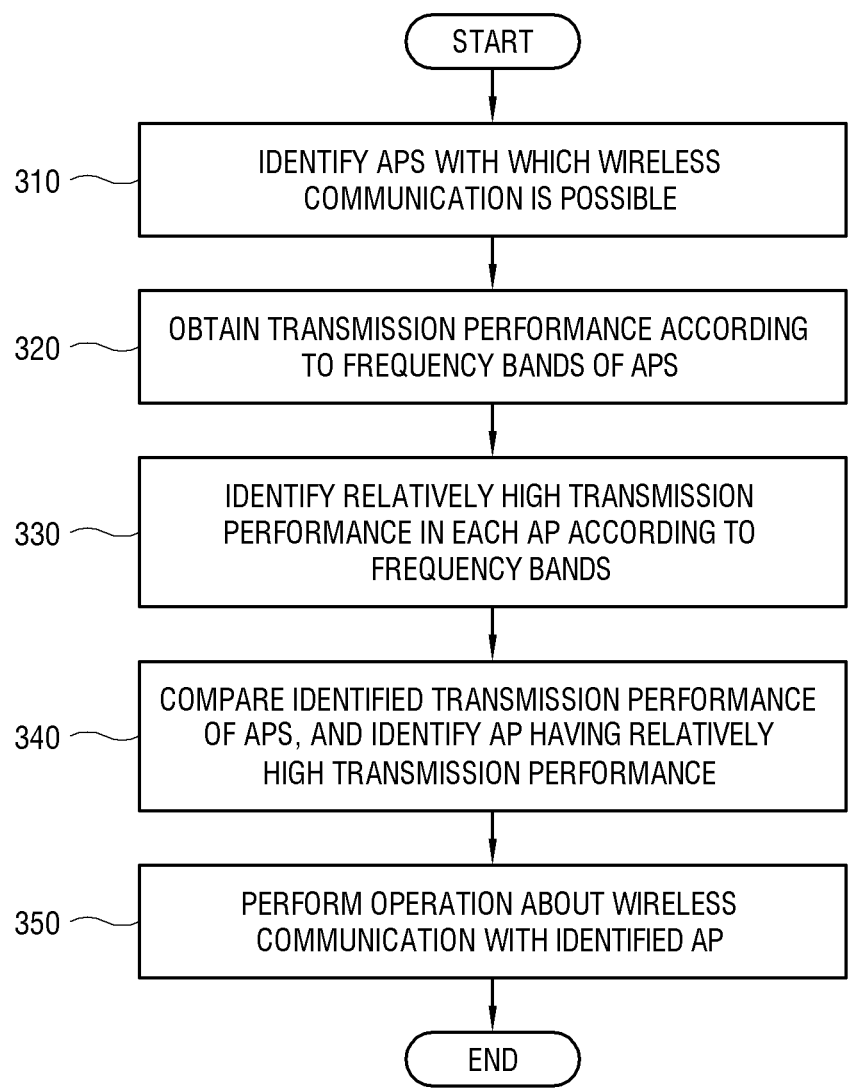
FIG. 3 is a flowchart showing a method of controlling an electronic apparatus according to an example embodiment.

FIG. 3 is a flowchart showing a method of controlling an electronic apparatus according to an embodiment.

As shown in FIG. 3, the following operations are carried out by the processor of the electronic apparatus.

At operation 310, the electronic apparatus identifies a plurality of APs with which wireless communication is possible. To identify various APs with which communication connection is possible, the electronic apparatus performs scanning based on a beacon frame received from the APs. In this regard, details will be described later.

At operation 320, the electronic apparatus obtains transmission performance according to frequency bands of the identified APs. The transmission performance may include a data transfer speed. Besides the data transfer speed, the transmission performance may include various parameters. In case of the IEEE 802.11 standards, there are valid frequency bands of 2.4 GHz and 5 GHz. Among the APs, there are an AP supporting both 2.4 GHz and 5 GHz, and an AP supporting only one of 2.4 GHz and 5 GHz.

At operation 330, the electronic apparatus identifies relatively high transmission performance in each AP according to frequency bands. For example, there may be an AP having higher transmission performance at 2.4 GHz between 2.4 GHz and 5 GHz, and an AP having higher transmission performance at 5 GHz between 2.4 GHz and 5 GHz.

At operation 340, the electronic apparatus compares the plurality of APs based on the identified transmission performance, and identifies the AP having relatively higher transmission performance.

At operation 350, the electronic apparatus connects to and performs the wireless communication with the identified AP. This operation may include automatically connecting with the identified AP, or displaying the UI in which the identified AP is sorted so that it is easily selectable by a user.

Thus, the electronic apparatus provides communication quality of higher transmission performance to a user.

Below, it will be described that the electronic apparatus performs communication connection with the AP.

Figure 4:
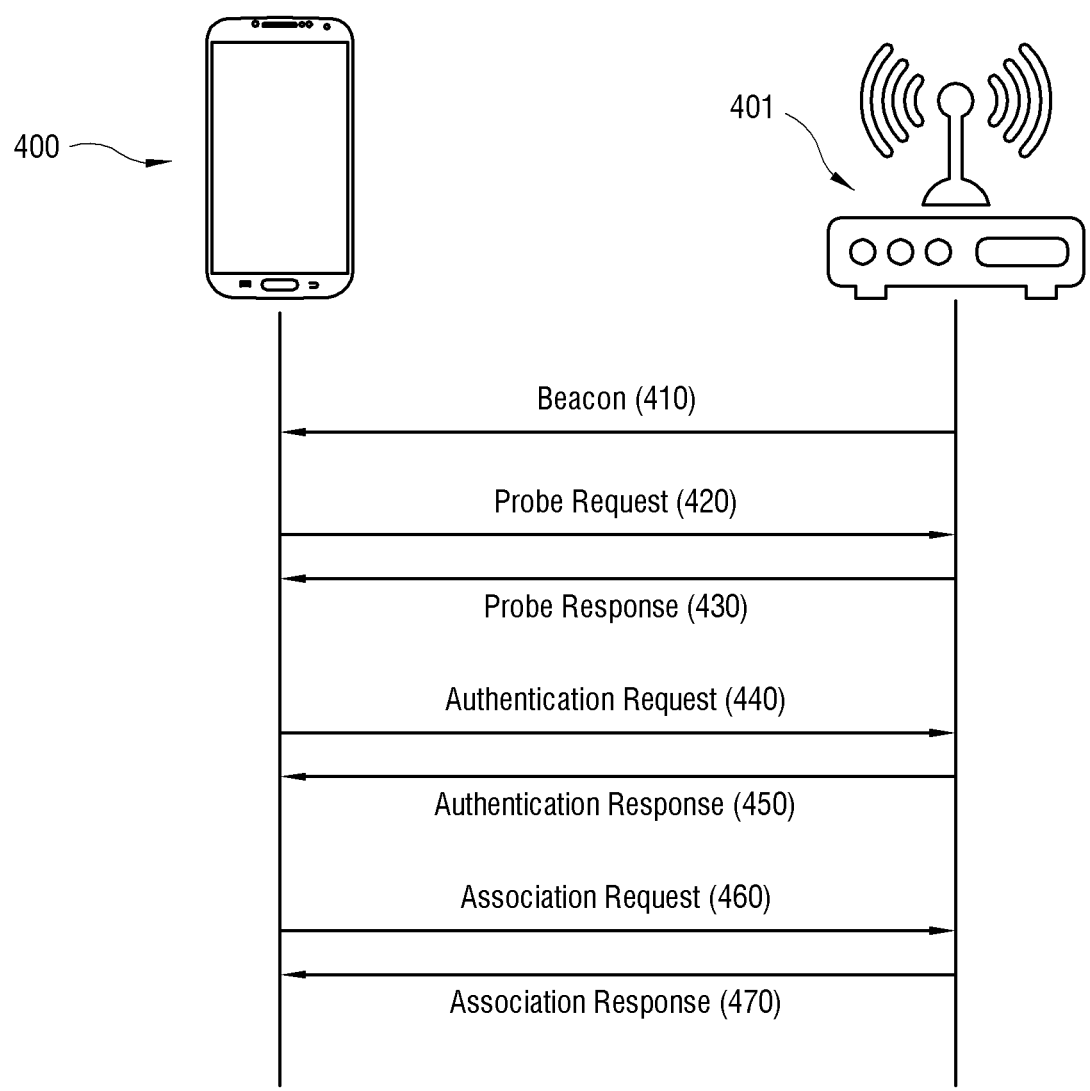
FIG. 4 illustrates a process for communication connection between an electronic apparatus and an AP according to an example embodiment.

FIG. 4 illustrates a process for communication connection between an electronic apparatus and an AP according to an embodiment.

As shown in FIG. 4, an electronic apparatus 400 may be configured to transmit and receive a beacon 410, a probe request 420, a probe response 430, an authentication request 440, an authentication response 450, an association request 460, and an association response 470, for communication connection with the AP 401 based on the IEEE 802.11 standards. The process is performed in such a manner that the electronic apparatus 400 transmits a request of a predetermined purpose to the AP 401 and receives a response to the request from the AP 401.

During the operations of transmitting and receiving the beacon 410, the probe request 420 and the probe response 430, the electronic apparatus 400 performs searching for a channel used by the AP 401 to connect with the AP 401. The searching includes passive searching and active searching. The passive searching may refer to a process that the electronic apparatus 400 searches for the AP 401 based on a beacon frame periodically transmitted by the AP 401. The active searching may refer to a process that the electronic apparatus 400 searches for the AP 401 based on probe request frames corresponding to channels. When the electronic apparatus 400 has already had network information about the AP 401, the process of the beacon 410 may be omitted.

The beacon frame transmitted by the AP 401 includes the network information about the AP 401, such as subsystem identification (SSID), a channel, encryption information, a transmission rate, etc. of the AP 401. The electronic apparatus 400 recognizes the AP 401 based on transmitting the probe request 420 to the AP 401 and receiving the probe response 430 to the probe request 420 from the AP 401.

In the operations of the authentication request 440 and the authentication response 450, the security authentication for the electronic apparatus 400 is carried out by the AP 401.

In the operations of the association request 460 and the association response 470, a connection setting process for the electronic apparatus 400 is performed. In this case, a connection process of the electronic apparatus 400 to the AP 401, or a reconnection process based on the movement of the electronic apparatus 400 to another AP 401 is performed. After the connection with the AP 401 is completed, the electronic apparatus 400 can perform wireless communication via the AP 401.

When the electronic apparatus 400 detects the plurality of APs 401, the electronic apparatus 400 identifies the communication quality according to the APs 401 as described in the foregoing embodiment, and provides a user with the APs 401 sorted to be selectable based on the identified communication quality. Then, the electronic apparatus 400 is connected to the AP 401 selected by a user, thereby carrying out the wireless communication.

Below, a method that the electronic apparatus identifies the communication quality of each AP will be described.

FIG. 5 shows an example of a list of data transfer speeds according to transmission modes of a first communication module included in an electronic apparatus.

As shown in FIG. 5, communication performance of a predetermined communication module according to conditions may be generated on a list 500. Such a list 500 may be generated based on various experiments of a manufacturer or developer, and recorded in the storage of the electronic apparatus when the electronic apparatus is manufactured, or received in the electronic apparatus from a server providing the list 500.

The electronic apparatus includes a communication module or communication chipset that supports wireless communication with the AP. The communication modules may be different according to different manufacturer or model specifications, and may show different communication performances according to their specifications under the same use condition. For example, the list 500 of the first communication module corresponding to a predetermined model of a predetermined manufacturer shows data transfer speeds according to signal strength levels at a plurality of transmission modes.

The IEEE 802.11 standards support two frequency bands of 2.4 GHz and 5 GHz. In the frequency band of 2.4 GHz, there are transmission modes of 802.11b, 802.11g, 802.11n, etc. In the frequency band of 5 GHz, there are transmission modes of 802.11a, 802.11n, 802.11ac, etc. The transmission mode of 802.11n are present at both 2.4 GHz and 5 GHz.

The 802.11b standard was released in 1999, employing a radio wave of the 2.4 GHz band and having the maximum transfer speed of 11 Mbps. The 802.11a standard was released in 1999, employing a radio wave of the 5 GHz band and having the maximum transfer speed of 54 Mbps. The 802.11g standard was released in 2003, employing a radio wave of the 2.4 GHz band and having the maximum transfer speed of 54 Mbps. The 802.11n standard was released in 2009, employing a radio wave of the 2.4 GHz or 5 GHz band and having the maximum transfer speed of 600 Mbps. The 802.11ac standard was released in 2012, employing a radio wave of the 5 GHz band. The 802.11ac standard enables multi-station WLAN throughput of at least 1 Gbit/s and a maximum single link throughput of at least 500 Mbit/s.

The communication quality based on the 5 GHz band is released later, but is not always better than that the communication quality based on the 2.4 GHz band. That is, according to use environments between the electronic apparatus and the AP, the 5 GHz band may offer better communication quality between the electronic apparatus and the AP than the 2.4 GHZ band, and vice versa. The maximum speed of the 5 GHz band is theoretically higher than that of the 2.4 GHz band, but the 5 GHz band is relatively vulnerable to an obstacle. In other words, the 2.4 GHz band has wider coverage than the 5 GHz. Further, in terms of the transmission mode, the 802.11ac standard supports normal operation only under relatively high signal strength.

Therefore, according to an embodiment, a distance between the electronic apparatus and the AP are taken into account when selecting an optimum transmission mode because the 5 GHz band is not unconditionally better than the 2.4 GHz.

Below, the content of the list 500 will be described.

The list 500 shows data transfer speeds corresponding to signal strength levels under the plurality of transmission modes according to the frequency bands. The transmission modes of 802.11b, 802.11g and 802.11n are present in the 2.4 GHz band, and the transmission modes of 802.11a, 802.11n, 802.11ac are present in the 5 GHz band.

The signal strength may be measured while the electronic apparatus is sending a request to the AP and the AP sending a response to the electronic apparatus. The signal strength usually increases as a physical distance between the electronic apparatus and the AP decreases, but not all the time. The important thing in the wireless communication between the electronic apparatus and the AP is the data transfer speed. Higher signal strength does not necessarily mean higher data transfer speed.

Referring to the list 500, the data transfer speeds of the 802.11b, 802.11g, and 802.11n (2.4 GHz) standards under the signal strength of '−50 dBm' are '10', '53', '67', respectively, and the data transfer speeds of the 802.11a, 802.11n (5 GHz) and 802.11ac standards under the same signal strength are '52', '90' and '250', respectively (where, the data transfer speed is given in units of Mbps). Under the signal strength of '−50 dBm', the transmission modes sorted in order of data transfer speed from highest to lowest are the 802.11ac, 802.11n(5 GHz), 802.11n(2.4 GHz), 802.11g, 802.11a and 802.11b standards. Under the signal strength of '−50 dBm,' the data transfer speeds based on the 802.11ac and 802.11n standards in the 5 GHz band are higher than the data transfer speeds in the 2.4 GHz band, but the data transfer speed based on the 802.11a standard in the 5 GHz band is lower than the data transfer speeds based on the 802.11n and 802.11g standards in the 2.4 GHz band.

Further, the data transfer speeds of the 802.11b, 802.11g, 802.11n (2.4 GHz), 802.11a, 802.11n and 802.11ac (5 GHz) standards under the signal strength of '−75 dBm' are '3', '10', '2.5', '13', '9' and '0.3', respectively (where, the data transfer speed is given in units of Mbps). Under the signal strength of '−75 dBm', the transmission modes sorted in order of data transfer speed from highest to lowest are the 802.11a(5 GHz), 802.11g(2.4 GHz), 802.11n(5 GHz), 802.11b(2.4 GHz), 802.11n(2.4 GHz) and 802.11ac(5 GHz) standards. In this case, the 802.11b standard has the lowest data transfer speed, and the 802.11a standard has the highest data transfer speed. Further, in this case, the data transfer speed based on the 802.11g standard in the 2.4 GHz band is higher than the data transfer speed based on the 802.11n standard in the 5 GHz band.

As described above, the electronic apparatus obtains the signal strength of each AP when the plurality of APs are found. When the electronic apparatus includes the first communication module, the electronic apparatus identifies the data transfer speeds of the transmission modes under the obtained signal strength, based on the list 500 associated with the first communication module. Thus, the electronic apparatus can identify the transmission mode having the best data transfer speed, based on the list 500 showing the data transfer speeds of the transmission modes according to the signal strength in reference to the specifications of the communication module.

Further, the electronic apparatus may identify the transmission modes supported by each AP based on network information obtained from the beacon frame of the corresponding AP, and exclude the transmission mode not supported by the AP. For example, when the AP does not support the 802.11ac standard among the 802.11b, 802.11g, 802.11n(2.4 GHz), 802.11a, 802.11n(5 GHz) and 802.11ac standards, the electronic apparatus identifies the data transfer speeds with regard to the other standards of 802.11b, 802.11g, 802.11n(2.4 GHz), 802.11a and 802.11n(5 GHz) on the list 500.

The list 500 may be prepared with respect to all the communication modules. Because the communication modules are different in performance according to their specifications, the values in the list 500 may vary depending on the specifications of the communication module. Below, a list for a second communication module different in specifications from the first communication module will be described.

FIG. 6 is an example of a table in which data transfer speeds are tabulated corresponding to transmission modes of a second communication module included in an electronic apparatus according to an embodiment.

As shown in FIG. 6, a list 600 of the second communication module different in specifications from the first communication module may be provided to an electronic apparatus. The configuration of the list 600 is about the same as those of the foregoing embodiment, and thus descriptions thereof will not be repeated. The second communication module may be different in a manufacturer from the first communication module, may be different in model from the first communication module even though they are of the same manufacturer, or may be different in a production process from the first communication module even though they are of the same manufacturer and the same model. Due to such differences, individual items on the list 600 related to the second communication module may be different in numerical values from those of the first communication module.

Referring to the list 600, the data transfer speeds of the 802.11b, 802.11g, 802.11n (2.4 GHz), 802.11a, 802.11n and 802.11ac(5 GHz) standards under the signal strength of '−50 dBm' are '10', '53', '78', '41', '60' and '220', respectively (where, the data transfer speed is given in units of Mbps). As compared with the numerical values of the foregoing first communication module under the same signal strength, there are differences.

Under the signal strength of '−50 dBm', the transmission modes sorted in order of data transfer speed from highest to lowest are the 802.11ac(5 GHz), 802.11n(2.4 GHz), 802.11n(5 GHz), 802.11g, 802.11a, and 802.11b standards. Under the signal strength of '−50 dBm,' the data transfer speed based on the 802.11n standard in the 2.4 GHz band is higher than the data transfer speed based on the 802.11n standard in the 5 GHz band Further, the data transfer speeds of the 802.11b, 802.11g, 802.11n (2.4 GHz), 802.11a, 802.11n (5 GHz) and 802.11ac standards under the signal strength of '−75 dBm' are '3', '10', '2.5', '3', '8' and '2', respectively (where, the data transfer speed is given in units of Mbps). Under the signal strength of '−75 dBm', the transmission modes sorted in order of data transfer speed from highest to lowest are the 802.11g(2.4 GHz), 802.11n(5 GHz), 802.11b(2.4 GHz), 802.11a(5 GHz), 802.11n(2.4 GHz), and 802.11ac standards. In other words, the data transfer speed based on the 802.11ac standard has the lowest value, and the data transfer speed based on the 802.11g standard has the highest value.

Accordingly, the electronic apparatus obtains the list corresponding to the specifications of its communication module, and identifies the AP showing relatively higher data transfer speed based on the obtained list.

Below, it will be described that the electronic apparatus identifies the AP showing the best data transfer speed among the plurality of APs with reference to the list as described above.

FIG. 7 illustrates an example of a list from which an electronic apparatus identifies an AP showing the best data transfer speed according to an embodiment.

As shown in FIG. 7, the electronic apparatus identifies the transmission mode showing the best transfer speed with respect to a plurality of connectable APs. Such an identifying operation is performed based on the list of APs corresponding to the specifications of the communication module.

For example, it will be assumed that the signal strength of '−60 dMB' is given when the electronic apparatus tries connecting with a first AP and the transmission modes supported by both the electronic apparatus and the AP are 802.11b, 802.11g, 802.11a, 802.11n(2.4 Hz), and 802.11n(5 GHz). According to the list 500 of FIG. 5, the data transfer speeds of the transmission modes such as the 802.11b, 802.11g, 802.11a, 802.11n (2.4 GHz) and 802.11n (5 GHz) are '9', '46', '51', '55' and '88', respectively (where, the data transfer speed is given in units of Mbps). Thus, the electronic apparatus identifies that the best data transfer mode for the first AP is 802.11n(5 GHz).

In this manner, a list 700 may be made to identify the best data transfer modes for a second AP, a third AP and a fourth AP connectable with the electronic apparatus. The list 700 is given for convenience to easily understand the embodiment, however, the embodiment is not limited thereto. For example, the electronic apparatus may not make this list 700 during operations.

The list 700 shows the highest transfer speeds of four APs. Among the four APs, the first AP operating based on the 802.11n(5 GHz) standard shows the fastest transfer speed. On the other hand, among the four APs, the third AP operating based on the 802.11g standard shows the slowest transfer speed.

Thus, the electronic apparatus displays a UI allowing a user to select one among the four APs, in which the four APs are sorted on the UI in order of the first AP, the second AP, the fourth AP and the third AP. Alternatively, the electronic apparatus may select the first AP among the four APs, and automatically perform wireless communication with the first AP based on the 802.11n(5 GHz) standard.

According to an embodiment, the electronic apparatus may adjust the order by additionally reflecting a separate parameter to the results such as the list 700. For example, the list 700 may additionally have a parameter of a communication quality index. The communication quality index refers to a weight of a communication state of a predetermined AP, based on a history about a communication connection state of the corresponding AP. The communication quality index is inversely proportional to a frequency of how often the communication connection with the AP is disconnected or a total time of the disconnection from the AP. The communication connection state with the AP is better as the communication quality index increases, and the communication connection state with the AP is worsened as the communication quality index decreases.

For example, it will be assumed that the communication quality index of the first AP is very low and the communication quality index of the second AP is very high. Although the first AP shows the best transmission performance, the quality of the communication with the first AP may be poor. On the other hand, even though the second AP shows lower transmission performance than the first AP, the quality of the communication with the second AP may be more stable than that of the first AP.

In this regard, the electronic apparatus can identify the AP, which has the best total communication quality based on combination of the transmission performance and the communication quality index, among the APs.

Below, it will be described that the electronic apparatus identifies the AP having the highest data transfer speed among the plurality of APs.

Figure 8:
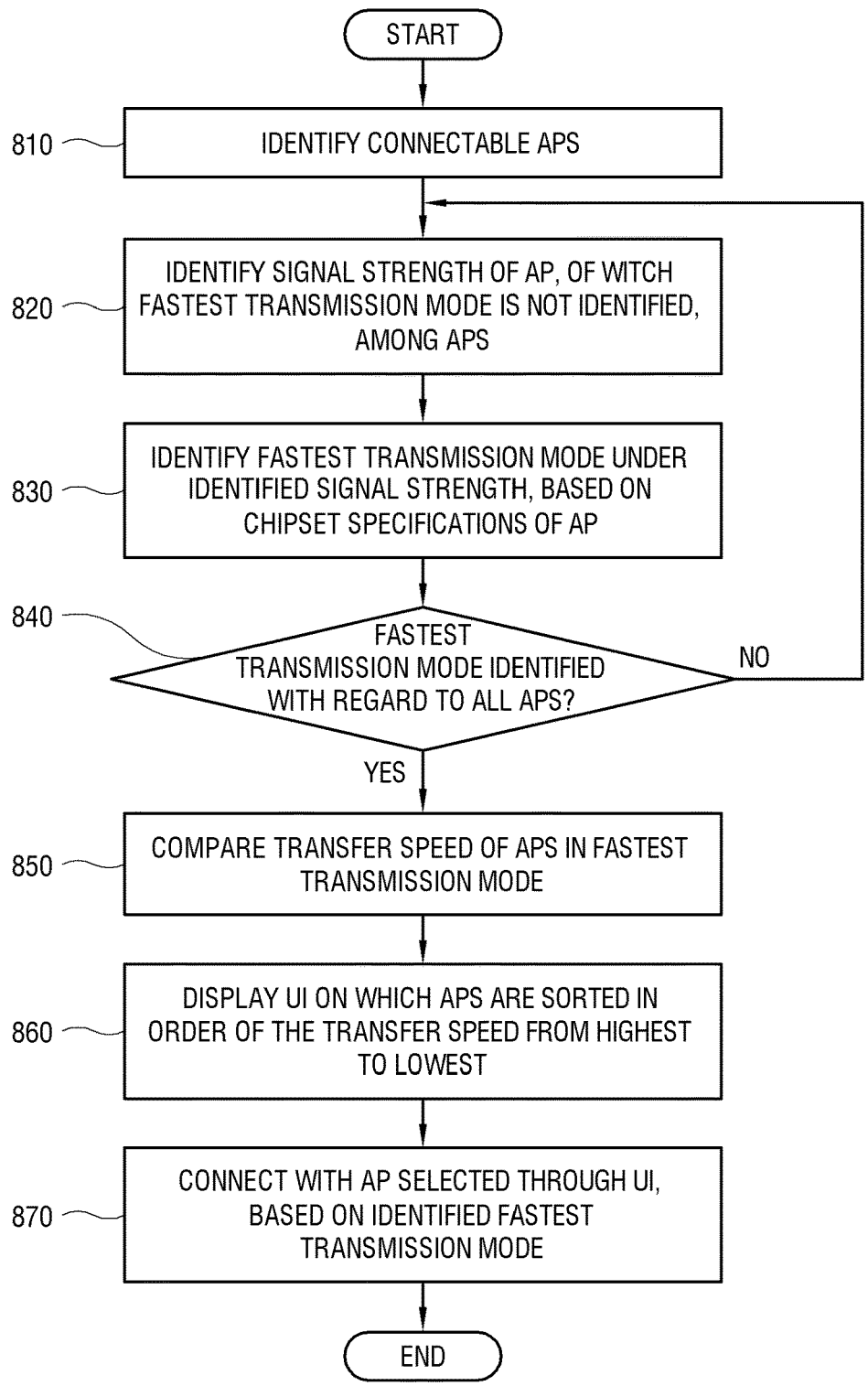
FIG. 8 is a flowchart showing a method that the electronic apparatus identifies an AP showing the highest data transfer speed among a plurality of Aps according to an example embodiment.

FIG. 8 is a flowchart showing a method that the electronic apparatus identifies an AP showing the highest data transfer speed among a plurality of Aps according to an embodiment.

As shown in FIG. 8, the following operations are performed by the processor of the electronic apparatus.

At operation 810, the electronic apparatus identifies a plurality of connectable APs.

At operation 820, the electronic apparatus identifies the signal strength of the AP, of which the fastest transmission mode is not yet identified, among the plurality of APs.

At operation 830, the electronic apparatus identifies the fastest transmission mode under the identified signal strength, based on the chipset specifications of the AP.

At operation 840, the electronic apparatus determines whether the fastest transmission mode is identified with respect to all the connectable APs. When there is an AP of which the fastest transmission mode is not identified, the electronic apparatus returns to the operation 820.

When the fastest transmission modes of all the connectable APs are identified, at operation 850, the electronic apparatus compares transfer speeds of all the APs in the fastest transmission mode.

At operation 860, the electronic apparatus displays a UI on which the plurality of APs are sorted in order of the transfer speed from highest to lowest.

At operation 870, the electronic apparatus performs communication connection with the AP selected through the UI, based on the identified fastest transmission mode.

The operations of the apparatus described in the foregoing embodiments may be performed by artificial intelligence provided in the corresponding apparatus. The artificial intelligence may be applied to various general systems by utilizing a machine learning algorithm. An artificial intelligence system refers to a computer system with intelligence of a human or being second to a human. In such a system, a machine, an apparatus or a system autonomously performs leaning and identifying and is improved in accuracy of recognition and identification based on accumulated experiences. The artificial intelligence is based on elementary technology by utilizing machine learning technology and algorithms based on an algorithm of autonomously classifying and learning features of input data, and copying perception, identification and the like functions of a human brain.

The elementary technology may for example include at least one of language comprehension technology for recognizing a language and a text of a human, visual understanding technology for recognizing a thing like a human sense of vision, inference and prediction technology for identifying information and logically making inference and prediction, knowledge representation technology for processing experience information of a human into knowledge data, and motion control technology for controlling a vehicle's automatic driving or a robot's motion.

Here, linguistic comprehension refers to technology of recognizing, applying and processing a human's language or text, and includes natural language processing, machine translation, conversation system, question and answer, voice recognition and synthesis, etc.

Inference and prediction refer to technology of identifying information and logically making prediction, and includes knowledge-based and probability-based inference, optimized prediction, preference-based plan, recommendation, etc.

Knowledge representation refers to technology of automating a human's experience information into knowledge data, and includes knowledge building such as data creation and classification, knowledge management such as data utilization, etc.

The methods according to the foregoing embodiments may be achieved in the form of one or more program instruction that can be implemented in various computers, and recorded in a computer readable medium. Such a computer readable medium may include a program instruction, a data file, a data structure or the like, or combination thereof. For example, the computer readable medium may be stored in a nonvolatile storage such as universal serial bus (USB) memory, regardless of whether it is deletable or rewritable, for example, a RAM, a ROM, a flash memory, a memory chip, an integrated circuit (IC) or the like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the embodiments. The program instruction recorded in this storage medium may be specially designed and configured according to the embodiments, or may be publicly known and available to those skilled in the art of computer software. Further, the computer program instruction may be implemented by a computer program product.

Although the embodiments have been shown and described, it will be appreciated by those skilled in the art that any modification and replacement may be made in these embodiments without departing from the principles and spirit of the disclosure, the scope of which is defined in the appended claims and their equivalents.

What is claimed is:

1. An electronic apparatus comprising:
   a communication circuit configured to perform wireless communication with a relay apparatus; and
   a processor configured to:
      identify a plurality of relay apparatuses connectable with the communication circuit, the plurality of relay apparatuses communicating in a plurality of frequency bands, the plurality of frequency bands being different from one another,
      identify a first relay apparatus having a frequency band, in which a transmission performance is relatively higher than a second relay apparatus, among the plurality of identified relay apparatuses, and
      perform the wireless communication with the identified first relay apparatus.

2. The electronic apparatus according to claim 1, wherein the processor is further configured to obtain information about a relationship between the frequency band and the transmission performance, and identify the first relay apparatus based on the obtained information.

3. The electronic apparatus according to claim 1, wherein the processor is further configured to identify each signal strength of the plurality of relay apparatuses, and identify the first relay apparatus based on the identified each signal strength of the plurality of relay apparatuses.

4. The electronic apparatus according to claim 1, wherein the frequency band comprises a plurality of transmission modes, and
   wherein the processor is further configured to identify the first relay apparatus by identifying a first transmission mode, in which the transmission performance is relatively higher than a second transmission mode, among the plurality of transmission modes of the plurality of relay apparatuses, and comparing the transmission performance of the first transmission mode and the second transmission mode.

5. The electronic apparatus according to claim 1, wherein the communication circuit comprises a communication chipset configured to perform the wireless communication, and
   wherein the processor is further configured to identify features according to the plurality of frequency bands of the communication chipset, and identify the first relay apparatus based on the identified features according to the plurality of frequency bands of the communication chipset.

6. The electronic apparatus according to claim 1, wherein the processor is further configured to provide an interface to a user so that the first relay apparatus of which the transmission performance is higher than the second relay apparatus can be connected in preference among the plurality of relay apparatuses.

7. The electronic apparatus according to claim 6, further comprising a display,
   wherein the processor is further configured to control the display to display a list on which the plurality of relay apparatuses are sorted in an order of the transmission performance.

8. The electronic apparatus according to claim 1, wherein the processor is further configured to control the communication circuit to connect with the first relay apparatus.

9. The electronic apparatus according to claim 1, wherein the communication circuit is configured to communicate with the first relay apparatus based on Institute of Electrical and Electronics Engineers (IEEE) 802.11 standards.

10. A method of controlling an electronic apparatus, the method comprising:
    identifying a plurality of relay apparatuses connectable with the electronic apparatus, the plurality of relay apparatuses communicating in a plurality of frequency bands, the plurality of frequency bands being different from one another;
    identifying a first relay apparatus having a frequency band, in which a transmission performance is relatively higher than a second relay apparatus, among the plurality of identified relay apparatuses; and
    performing wireless communication with the identified first relay apparatus.

11. The method according to claim 10, further comprising: obtaining information about a relationship between the frequency band and the transmission performance, and identifying the first relay apparatus based on the obtained information.

12. The method according to claim 10, further comprising:
    identifying each signal strength of the plurality of relay apparatuses, and identifying the first relay apparatus based on the identified each signal strength of the plurality of relay apparatuses.

13. The method according to claim 10, wherein the frequency band comprises a plurality of transmission modes, and
    wherein the method further comprises: identifying the first relay apparatus by identifying a first transmission mode, in which the transmission performance is relatively higher than a second transmission mode, among the plurality of transmission modes of the plurality of relay apparatuses and comparing the transmission performance of the first transmission mode and the second transmission mode.

14. The method according to claim 10, further comprising identifying features according to the plurality of frequency bands of a communication chipset of the electronic apparatus, and identifying the first relay apparatus based on the identified features according to the plurality of frequency bands of the communication chipset.

15. The method according to claim 10, further comprising providing an interface to a user so that the first relay apparatus of which the transmission performance is higher than the second relay apparatus can be connected in preference among the plurality of relay apparatuses.

16. The method according to claim 15, further comprising displaying a list on which the plurality of relay apparatuses are sorted in an order of the transmission performance.

17. The method according to claim 10, further comprising controlling a communication circuit of the electronic apparatus to connect with the first relay apparatus.

18. The method according to claim 10, wherein the electronic apparatus is configured to communicate with the first relay apparatus based on Institute of Electrical and Electronics Engineers (IEEE) 802.11 standards.

* * * * *